J. D. CURTIS.
FERTILIZER DISTRIBUTER.
APPLICATION FILED APR. 10, 1914.
1,164,579.
Patented Dec. 14, 1915.
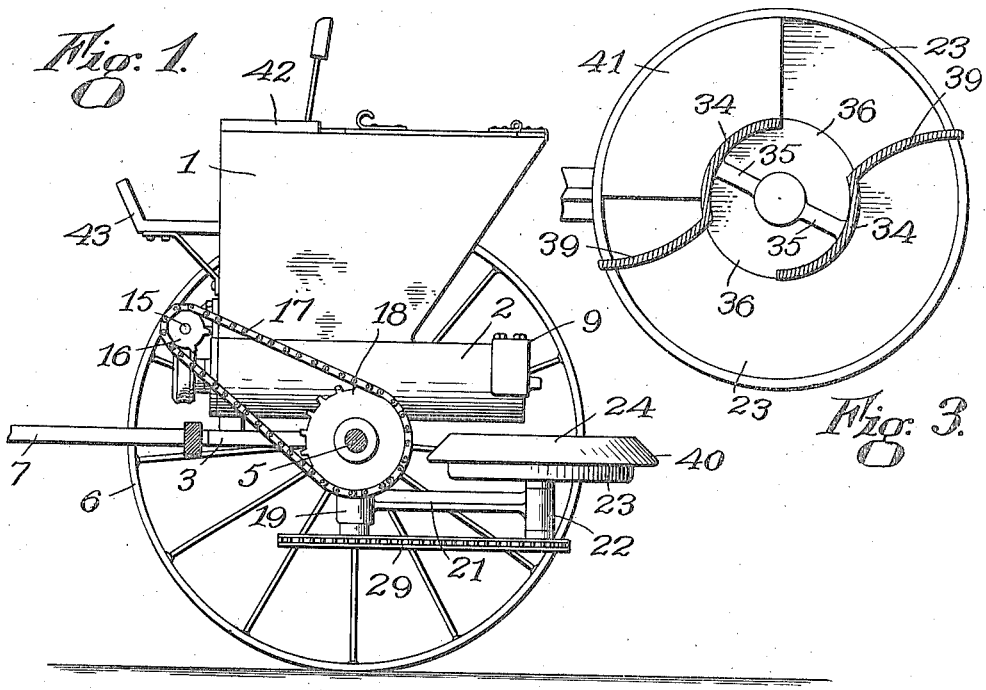
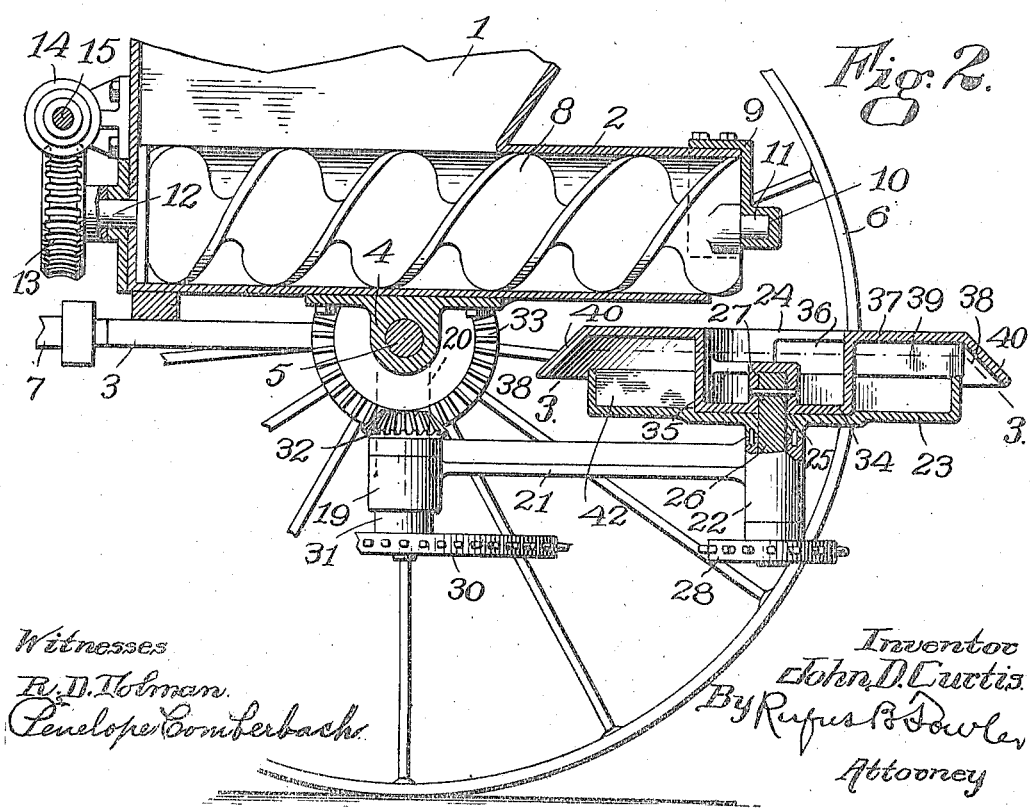
Witnesses
R. D. Tolman
Penelope Comberbach
Inventor
John D. Curtis
By Rufus B. Fowler
Attorney

UNITED STATES PATENT OFFICE.

JOHN D. CURTIS, OF WORCESTER, MASSACHUSETTS, ASSIGNOR TO RICHARDSON MANUFACTURING COMPANY, OF WORCESTER, MASSACHUSETTS, A CORPORATION OF MASSACHUSETTS.

FERTILIZER-DISTRIBUTER.

1,164,579.

Specification of Letters Patent.

Patented Dec. 14, 1915.

Application filed April 10, 1914. Serial No. 831,016.

*To all whom it may concern:*

Be it known that I, JOHN D. CURTIS, a citizen of the United States, residing at Worcester, in the county of Worcester and Commonwealth of Massachusetts, have invented a new and useful Improvement in Fertilizer-Distributers, of which the following, together with the accompanying drawing, is a specification.

My invention relates to fertilizer spreaders or distributers and more particularly to that type of fertilizer spreader adapted to spread more or less finely divided or comminuted commercial fertilizer. Most forms of commercial fertilizers are light and, if exposed, are easily blown about by the wind so as to be unevenly distributed and thus partially wasted.

One object of the invention is to provide an improved form of fertilizer distributer so constructed that the fertilizer is substantially protected from the wind up to the time that it leaves the distributer.

Another object of the invention is to provide a fertilizer distributer with means for deflecting the fertilizer toward the ground as it leaves the distributer. With this feature of construction, the wind interferes much less with the proper distribution of the fertilizer than in the case of distributers which are allowed to throw the fertilizer upwardly and horizontally to considerable distances. The deflecting means also permits the fertilizer to be distributed in predetermined narrow paths without the necessity of slowing down the moving parts of the distributer and thus reducing the quantity of fertilizer distributed.

Other objects and advantages will appear from the following description taken in connection with the accompanying drawing, in which—

Figure 1 is a side view of a fertilizer distributer constructed in accordance with my invention, the nearer wheel being removed; Fig. 2 is a central vertical sectional view of the operating parts of the distributer; and Fig. 3 is a sectional plan view on the line 3—3 of Fig. 2.

Like reference characters refer to similar parts in the different figures.

In the form of invention shown in the drawing, the distributer includes a fertilizer receptacle 1 with a feed tube 2 projecting rearwardly from the center of its base. The receptacle 1 and tube 2 are supported by a frame 3 and a bearing 4 in which turns the axle 5, the axle 5 being secured to the wheels 6 so as to be driven thereby. A pole or pair of shafts 7 is provided so that the distributer may be drawn along the ground.

A feeding screw 8 serves to move fertilizer slowly from the lower part of the receptacle 1 toward the rear end of the feed tube 2, the feed tube communicating at its forward end with the interior of the receptacle 1 so that fertilizer within the receptacle may fall by gravity upon the feed screw 8. The upper portion of the opening at the rear end of the feed tube 2 is closed by a cap 9, this cap being formed with an inwardly directed recess 10 which acts as a bearing to support a spindle 11 projecting axially from the rear end of the feeding screw 8. A second spindle 12 projects axially from the forward end of the feeding screw 8 through the front wall of the receptacle 1 and feed tube 2 and carries a worm gear 13 which is driven by a worm 14 on a shaft 15. The shaft 15 also carries a sprocket 16 driven by a chain 17 and a second sprocket 18 secured to the axle 5. As the axle 5 is rotated by the main supporting wheels 6, therefore, the driving connections just described cause the feeding screw 8 to rotate so as to feed fertilizer from the base of the receptacle 1 through the feed tube 2, whence it is ejected through the restricted opening under the lower edge of the cap 9 and falls by gravity into the distributing means, to be described later.

A vertical bearing 19 is supported beneath the axle 5 by arms 20 depending from the frame of the distributer, a rigid arm 21 projecting rearwardly from the bearing 19 and lying beneath the rear portion of the feed tube 2. A vertical bearing 22 is formed upon the rear end of the arm 21 and resting upon this bearing 22 is a horizontal circular pan-shaped fertilizer support 23, the outer edge of which is upturned as shown. A horizontal fertilizer spreading or distributing member 24 rests upon the pan 23 and is secured by a pin 25 to the upper end of a vertical shaft 26 rotatable in the bearing 22 and extending upwardly through the bottom of the pan 23 into a suitable recess 27 formed in the under face of the distributing member 24. A sprocket 28 secured to the lower end of the shaft 26 is connected by a chain 29 with a sprocket 30 secured to the lower end of a vertical shaft 31 rotatable in the bearing 19. A bevel gear 32 secured to the upper end of the shaft 31 is in mesh with a second bevel gear 33 secured to the axle 5. The driving connections just described permit the distributing member 24 to be rotated by the axle 5 as it is turned by the main supporting wheels 6.

The fertilizer distributing member 24 includes a central portion 34 in the form of a vertical cup having a cylindrical vertical wall and a flat bottom resting upon the bottom of the pan 23. The center of the bottom of this cup 34 is raised to form the recess 27, and the upper end of the wall surrounding this recess 27 is connected rigidly with the vertical cylindrical wall of the cup 34 by rigid strengthening arms 35. The length of the arm 21 is such that the cup 34 is located approximately under the opening at the rear end of the feed tube 2 so that, as fertilizer is forced through this opening by the feeding screw 8, it will fall by gravity into the cup 34.

The vertical wall of the cup 34 is shown as being provided with two openings 36, although the number of these openings may be varied if desired. As the cup 34 is rotated, the fertilizer which has fallen into it from the rear end of the feed tube 2 is thrown outwardly by centrifugal force through the openings 36 into the outer portion of the pan 23 between the vertical wall of the cup 34 and the upturned outer edge of the pan.

The distributing member further includes an annular plate 37 surrounding and extending horizontally from the upper edge of the cylindrical wall of the cup 34, which is somewhat taller than the upturned outer edge of the pan 23 so as to leave an open space 38 between the upturned edge of the pan 23 and the under surface of the annular plate 37.

A scraping and distributing arm 39 extends approximately radially outwardly from the trailing vertical edge of each opening 36. The arms 39 extend downwardly from the annular plate 37 just far enough to reach the upturned outer edge of the pan 23. As the fertilizer is thrown outwardly through the openings 36, it settles in the pan 23 until deep enough to be reached by the lower edges of the arms 39. When any fertilizer rests upon the pan 23 deeply enough to reach the path of the arms 39, the arms scrape off that portion of the fertilizer lying in their path and throw it outwardly over the upturned outer edge of the pan. This outward motion of the fertilizer is caused largely by centrifugal force but is partly due to the form of the arms 39, the outer ends of which are bent slightly backwardly so as to increase their tendency to move the fertilizer toward the outer edge of the pan 23.

A flange 40 slopes outwardly and downwardly from the periphery of the annular plate 37, this flange 40 lying in the path of the fertilizer as it is thrown horizontally past the upturned edge of the pan 23 and thus serving to deflect the fertilizer downwardly toward the ground instead of allowing it to be thrown horizontally to considerable distances where the wind might scatter it unevenly or beyond the desired area and thus cause waste. The plate 37 covers and protects the fertilizer lying in the pan 23 so that it cannot be disturbed or blown about by the wind before leaving the distributer.

A filling block 41 is provided in the pan 23, the location of this block and its angular extent about the axis of the pan being such as to prevent or reduce the spreading of fertilizer in any predetermined direction such as toward the forward portion of the machine or toward a person walking at one side of the machine. A seat 42 and a foot rest 43 are shown for the convenience of the driver.

While I have shown and described the details of one form of my invention, I do not wish to be limited to such details as changes may be made without departing from the spirit of the invention; but Having described my invention, what I claim as new and desire to secure by Letters Patent is:

1. A fertilizer distributer including a stationary support for fertilizer, rotatable means for scraping the fertilizer past the edges of the support to distribute it, and a protecting plate above the scraping means to protect the fertilizer from outside air currents, said protecting plate being larger than said support and having a depending flange at its edge extending below the plane of said support.

2. A fertilizer distributer including a receptacle with an upturned edge for holding fertilizer, means for supplying fertilizer to the receptacle, and a substantially horizontal arm revoluble about a substantially vertical axis for scraping the fertilizer over the upper edge of the receptacle.

3. A fertilizer receptacle including a stationary support for fertilizer, a substantially horizontal arm revoluble about a substantially vertical axis for distributing fertilizer from the edges of the support, and a protecting plate overlying the arm and spaced above the support, said plate having a depending beveled flange extending downwardly below the plane of the revolving arm, whereby the fertilizer is deflected by said flange downwardly and outwardly at an oblique angle to the plane of the revolving arm.

4. A fertilizer distributer including a support for fertilizer, a protecting plate spaced above the support, an arm carried by the under surface of the plate and revoluble therewith for scraping fertilizer from the edges of the support, and means for rotating the plate and arm relatively to the support.

5. A fertilizer distributer including a support for fertilizer, and a rotatable fertilizer distributing member having a central cup and an arm radiating therefrom above the support, the cup having an opening in its side wall to permit fertilizer to be moved into the path of the arm from within the cup.

6. A fertilizer distributer including a support for fertilizer, and a rotatable fertilizer distributing member having a central cup, an annular plate surrounding the upper edge of the cup and spaced above the support, and an arm radiating from the cup and lying under the plate for distributing fertilizer from the support, the cup having a side opening to permit fertilizer to be moved into the path of the arm from within the cup.

7. A fertilizer distributer including a pan with an upturned periphery for holding fertilizer, and a rotatable fertilizer distributing member having a central cup resting on the bottom of the pan, an annular plate surrounding the upper edge of the cup and spaced above the edge of the pan, and an arm radiating from the cup and lying between the pan and the plate, the cup having a side opening to permit fertilizer to be moved into the path of the arm from within the cup.

8. A fertilizer distributer including a pan with an upturned periphery for holding fertilizer, a rotatable fertilizer distributing member having a central cup resting on the bottom of the pan, an annular plate surrounding the upper edge of the cup and spaced above the edge of the pan, an arm radiating from the cup and lying between the pan and the plate, the cup having a side opening to permit fertilizer to be moved into the path of the arm from within the cup, and a downturned flange at the edge of the plate for deflecting fertilizer downwardly as it is moved over the edge of the pan by the arm.

9. A fertilizer distributer including a pan with an upturned periphery for holding fertilizer, a rotatable fertilizer distributing member having a central cup and an arm radiating therefrom and lying above the pan, the cup having a side opening to permit fertilizer to be moved into the path of the arm from within the cup, and a filler block at one side of the pan to reduce the distribution of fertilizer from that side of the pan by partially closing the side opening in the cup as it passes the filler block.

Dated this sixth day of April, 1914.

JOHN D. CURTIS.

Witnesses:
PENELOPE COMBERBACH,
NELLIE WHALEN.